(12) United States Patent
Yokoyama et al.

(10) Patent No.: US 7,593,159 B2
(45) Date of Patent: Sep. 22, 2009

(54) DISPLAY DEVICE

(75) Inventors: Toshifumi Yokoyama, Osaka (JP);
Ken'ichi Kasazumi, Osaka (JP);
Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 562 days.

(21) Appl. No.: 10/573,990

(22) PCT Filed: Sep. 30, 2004

(86) PCT No.: PCT/JP2004/014791

§ 371 (c)(1),
(2), (4) Date: Mar. 30, 2006

(87) PCT Pub. No.: WO2005/031455

PCT Pub. Date: Apr. 7, 2005

(65) Prior Publication Data

US 2007/0035826 A1    Feb. 15, 2007

(30) Foreign Application Priority Data

Sep. 30, 2003    (JP)    ............................. 2003-340426

(51) Int. Cl.
*G03B 21/56* (2006.01)
(52) U.S. Cl. .................................... 359/446
(58) Field of Classification Search ............. 359/444, 359/445, 446

See application file for complete search history.

(56) References Cited

U.S. PATENT DOCUMENTS

| | | | | |
|---|---|---|---|---|
| 1,817,630 A * | 8/1931 | Kroesen | ...................... | 359/444 |
| 4,011,403 A | 3/1977 | Epstein et al. | .............. | 358/209 |
| 5,007,707 A * | 4/1991 | Bertagni | ..................... | 359/444 |
| 5,270,752 A * | 12/1993 | Kataoka et al. | ................ | 353/28 |
| 6,594,090 B2 | 7/2003 | Kruschwitz et al. | | |
| 6,857,746 B2 * | 2/2005 | Dyner | ......................... | 353/28 |

FOREIGN PATENT DOCUMENTS

| | | |
|---|---|---|
| DE | 1 572 800 | 3/1970 |
| DE | 297 01 132 | 4/1997 |
| JP | 55-65940 | 5/1980 |
| JP | 60-77179 | 5/1985 |
| JP | 3-189634 | 8/1991 |
| JP | 3-92897 | 9/1991 |
| JP | 05-38639 | 5/1993 |
| JP | 5-45689 | 6/1993 |
| JP | 8-314401 | 11/1996 |
| JP | 2001-100316 | 4/2001 |

(Continued)

*Primary Examiner*—Christopher Mahoney
(74) *Attorney, Agent, or Firm*—Steptoe & Johnson LLP

(57) ABSTRACT

A display device of the present invention is provided with a light source (4) for emitting coherent light and displaying an image, and an image receiving part (1) comprising not less than two screens, onto which the coherent light is projected, wherein at least one of the screens constituting the image receiving part (1) is vibrated by an airflow applied to a front or rear surface of the image receiving part (1). Further, the image receiving part (1) has a function of a speaker. Thereby, when coherent light is used as a light source for display, it is possible to suppress spots of light intensity which are called speckle noise and occur due to interference of laser beams reflected at the image receiving part.

9 Claims, 3 Drawing Sheets

FOREIGN PATENT DOCUMENTS

| JP | 2001-100317 | 4/2001 |
| JP | 2001142148 A | 5/2001 |
| JP | 2003-98476 | 4/2003 |
| JP | 2003-98601 | 4/2003 |
| JP | 2003262920 A | 9/2003 |

* cited by examiner

DISPLAY DEVICE

This application claims priority under 35 USC 371 to International Application No. PCT/JP2004/014791, filed on Sep. 30, 2004, which claims priority to Japanese Patent Application No. 2003-340426, filed on Sep. 30, 2003, the entire contents of which are hereby incorporated by reference.

TECHNICAL FIELD

The present invention relates to a display device for projecting coherent light on a screen or transmitting coherent light through a screen to display an image.

BACKGROUND ART

An example of a conventional display device using coherent light is shown in FIG. 4. A light source 50 contains a laser having a wavelength of 450 nm (blue), a laser having a wavelength of 520 nm (green), and a laser having a wavelength of 630 nm (red). These three laser beams are projected or scanned onto an image receiving part 51 using an optical element or a scanning unit to be displayed as an image. By using the laser beams having the wavelengths of 450 nm (blue), 520 nm (green), and 630 nm (red), respectively, the color gamut is expanded, and the color reproducibility is improved, whereby the image can be displayed in a color that is closer to the natural color. Further, reduction in power consumption can be achieved by using the lasers as the light source in contrast to the case of using a lamp, and further, the number of optical elements can be reduced because coherent light is employed, whereby miniaturization of the device can be expected.

However, when the laser beams as coherent light are projected onto the image receiving part to display an image, speckle noise occurs due to interference of the laser beams reflected at the image receiving part, and the speckle noise causes glittering of the image or bright and dark portions in the image. The principle of occurrence of speckle noise will be described with reference to FIG. 5. FIG. 5 is a lateral view of the image receiving part. Usually, the surface of the image receiving part 1 is not completely flat but has irregularities. A light beam 2 and a light beam 3 which are emitted from the light source 4 onto the image receiving part 1 are reflected at the image receiving part 1 and cross each other at a point A in FIG. 5. When phases of the respective light beams match at the point A (when a difference in light path lengths becomes equal to one wavelength), the light beams 2 and 3 interfere each other, and the light intensities are increased. Further, when the difference in light path lengths shifts by ½ wavelength, the light intensities are lowered. Because of speckle noise that occurs as described above, intensity spots appear in the displayed image, which result in glittering or bright and dark spots to human eyes. As a result, the quality of the projected image is degraded, which makes a viewer uncomfortable or tired, leading to considerable reduction in the product value.

As a method for avoiding such speckle noise, for example, a method of previously shifting the phase of a laser beam applied to the image receiving part has been proposed (refer to Japanese Published Patent Application No. 2003-98476: Patent Document 1). FIG. 6 is a schematic block diagram illustrating a laser display system for reducing speckle noise, which is disclosed in Patent Document 1. With reference to FIG. 6, the laser display system 100 comprises a laser 120, a beam expansion optics 124, a diffuser 134, and a beam shaping optics 138. The laser 120 emits a laser beam 122 of a desired wavelength continuously or pulsewise. The beam expansion optics 124 expands the laser beam 122 to generate a parallel beam 132 having a diameter required for filling an opening of the beam shaping optics 138. The expansion optics 124 includes a diverging lens 126 and a collimating lens 130. The diverging lens 126 converts the laser beam 122 into a diverging beam 128. The collimating lens 130 converts the diverging beam 128 into a parallel beam 132. The diffuser 134 is disposed between the laser 120 and the beam shaping optics 138 and driven by an operation assignment means 136. In the laser display system 100, the phase condition of the beam is made random using the diffuser 134, whereby an interference point on a screen 160 is made random to reduce speckle noise.

In the structure of the laser display system described in Patent Document 1, however, since the diffuser is employed, attenuation of optical output occurs when the light beam transmits the diffuser, and the attenuation during the transmission of the light beam becomes larger as the randomization of the phase condition by the diffuser is carried out with higher efficiency. Therefore, higher laser output is required. However, since it is usual that the output of a laser which is used as a light source for display is already considerably high (not less than 1 W), it is technologically difficult to increase the output power, and furthermore, large power consumption is required. An increase in the laser output becomes an obstacle to commercialization of a display device using a laser source.

DISCLOSURE OF THE INVENTION

In order to solve the above-mentioned problems, the present invention comprises a unit for emitting coherent light and displaying an image, and an image receiving part onto which the coherent light is projected, and the image receiving part is vibrated by an airflow that is supplied to its front surface or rear surface.

Therefore, according to the present invention, it is possible to reduce speckle noise under the state where attenuation of the coherent light in the light source is minimized.

Further, the present invention is characterized by that the airflow is supplied from a cooling fan disposed in the display device.

Further, the present invention is characterized by that the image receiving part comprises not less than two screens, and at least one of the screens is vibrated.

Further, the present invention is characterized by that the image receiving part has a function of a speaker.

Therefore, according to the present invention, it is possible to reduce speckle noise by making the screens themselves constituting the image receiving part operate as a speaker, and further, space-saving in the system can be achieved.

Further, the present invention is characterized by that the image receiving part generates an acoustic wave of a high frequency.

Therefore, according to the present invention, it is possible to vibrate the screens even when the contents outputted from the display device are silent, by giving a high-frequency generation signal to the screens.

Further, the present invention is characterized by that the frequency of the acoustic wave is not less than 20000 Hz.

Therefore, according to the present invention, since the image receiving part vibrates with acoustic waves that humans cannot hear, speckle noise can be reduced without making a viewer uncomfortable.

Further, in order to solve the above-mentioned problems, the present invention comprises a unit for emitting coherent light and displaying an image, and an image receiving part onto which the coherent light is projected, wherein the image receiving part is vibrated by an electric effect.

Therefore, according to the present invention, it is possible to reduce speckle noise while enhancing steadiness when screen vibration occurs.

Further, the present invention is characterized by that the image receiving part comprises not less than two screens, and at least one of the screens is provided with a coil, while at least one of the remaining screens is provided with a magnetic body.

BEST MODE TO EXECUTE THE INVENTION

In a display device using lasers as a light source, noise called "speckle noise" occurs, which causes irregular color in a projected image and gives a viewer a feeling that the image is glittering. The reason is as follows. Each of the lasers as a light source has a very narrow wavelength, and it is an approximately single wavelength, and further, it is coherent. Therefore, reflected waves easily interfere. Accordingly, it is necessary to prevent interference of the reflected light beams. As an approach for preventing such interference, it is proposed to randomly vary the phases of the reflected light beams from the image receiving part.

Hereinafter, according to the embodiments of the present invention, a description will be given of a method for reducing speckle noise by randomly varying the phases of reflected light beams from the image receiving part, in a display device having a unit for emitting laser light as coherent light and displaying an image (hereinafter referred to as a light source), and an image receiving part to which the laser light is projected.

Embodiment 1

Figure 1:
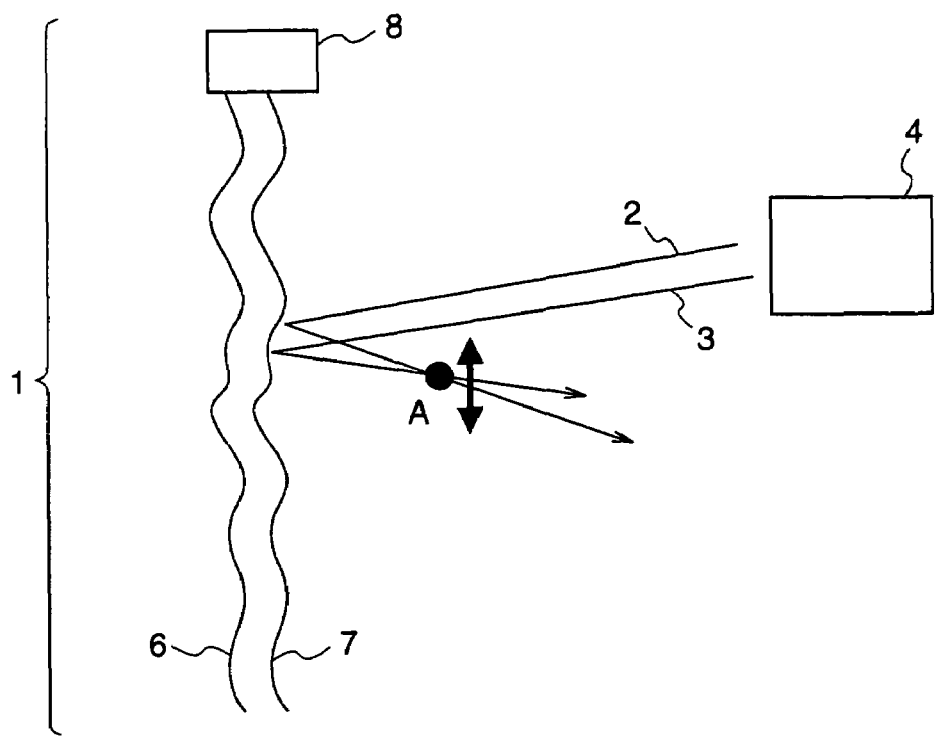
FIG. 1 is a schematic block diagram illustrating a display device according to a first embodiment of the present invention.

FIG. 1 is a lateral view of a display device according to a first embodiment of the present invention. As shown in FIG. 1, the display device relating to the first embodiment comprises an image receiving part 1, a light source 4, and a blower unit 8. Further, the image receiving part 1 comprises two screens 6 and 7. Any material may be used for the screens 6 and 7 so long as it can reflect coherent light. For example, it may be a material used for a screen of a general overhead projector (OHP).

Light beams 2 and 3 emitted from the light source 4 are projected on the image receiving part 1. The projected laser beams are reflected at the screen 6 or 7 to be displayed as an image. In this first embodiment, it is assumed that the laser beams are reflected at the screen 7. When the screen 7 is transparent, the laser beams may be reflected at the screen 6. As a material of the transparent screen, for example, transparent vinyl or transparent film may be employed. The blower unit 8 for sending air between the screen 6 and the screen 7 is disposed at an end of the screen. When a spacing between the screen 6 and the screen 7 is narrowed, an airflow generated by the blower unit 8 passes at a high speed between the screen 6 and the screen 7, whereby the screens 6 and 7 are vibrated at a high speed. When the airflow supplied by the blower unit 8 is randomly changed, the shapes of the screens 6 and 7 continuously change, whereby the position of a point A at which interference occurs changes randomly. Since the position of the point A continuously changes with time, the light intensity seems to be averaged to human eyes. Therefore, it appears there is no irregular color to human eyes. When actually a gas is randomly flowed between the screen 6 and the screen 7 using the blower unit 8 and laser beams are applied to the screens, reduction in speckle noise is recognized.

As described above, according to the display device of the first embodiment of the present invention, it is possible to reduce speckle noise by the relatively simple construction for supplying airflow to the front surface or rear surface of the image receiving part to vibrate the image receiving part. Further, it is also possible to avoid attenuation of the projected laser beams.

While in this first embodiment a description has been given of a display device that applies laser beams to a screen and monitors reflected beams (front projection type), it is obvious that similar effects can be obtained with respect to a display device in which laser beams transmit a screen (rear projection type).

Further, while in this first embodiment the image receiving part 1 comprises two screens (screens 6 and 7) and the screens 6 and 7 are vibrated, the present invention is not restricted thereto. The image receiving part 1 may comprise two or more screens, and at least one of the screens may be vibrated.

Furthermore, a cooling fan disposed in the display device may be used as a blower unit for supplying airflow. There are cases where a fan for cooling or heat stabilization is fixed in a rear projection type display device. When this fan is used for supplying airflow to the screen, reduction in speckle noise can be realized without increasing the number of components. Such cooling fan is also effective in a front projection type display so long as a spacing between a screen and a light source is narrow.

Embodiment 2

Figure 2:
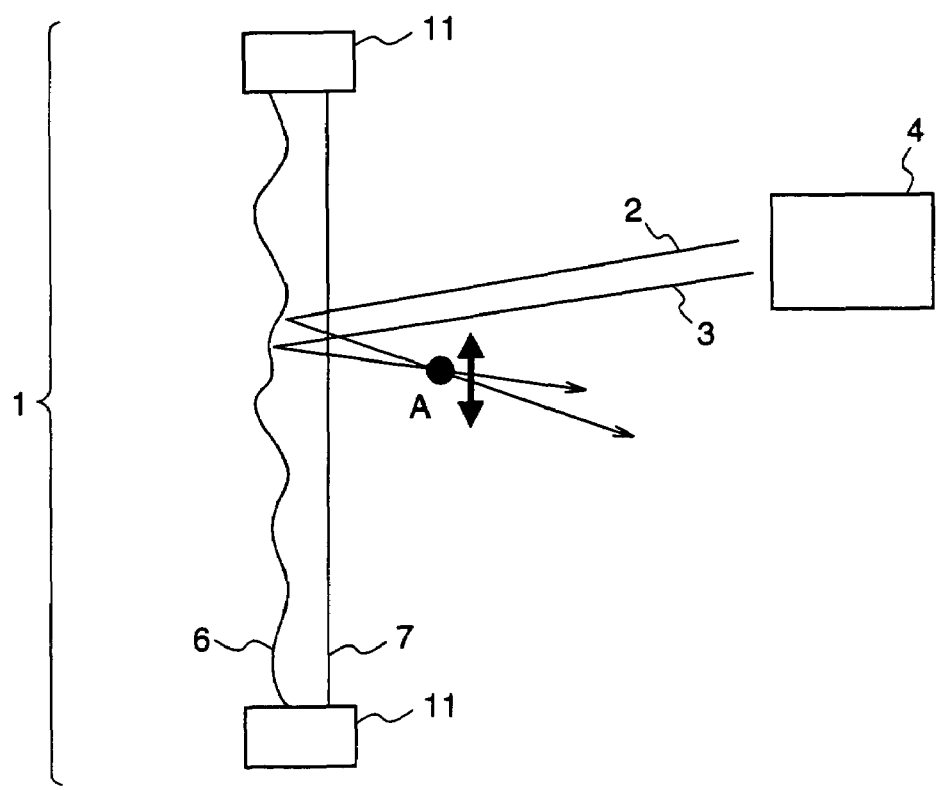
FIG. 2 is a schematic block diagram illustrating a display device according to a second embodiment of the present invention.

FIG. 2 is a lateral view of a display device according to a second embodiment of the present invention. The same constituents as those shown in FIG. 1 are given the same reference numerals. In the display device relating to the second embodiment of the invention, an image receiving part which comprises two or more screens, at least one of the screens being vibrated, functions as a speaker.

Hereinafter, a description will be given of the case where the image receiving part 1 comprises two screens. With reference to FIG. 2, the image receiving part 1 of the display device comprises two screens 6 and 7. The circumferences of the screens 6 and 7 are sealed with a shielding part 11. A gas is filled in a space between the screen 6 and the screen 7. Further, it is possible to vibrate the screen 6 or 7 by supplying, from a portion of the shielding part 11, something (e.g., an audio signal) that activates the gas between the screen 6 and screen 7. In the display device according to the second embodiment, the screen 7 is vibrated more than the screen 6.

Further, it is possible to generate an acoustic wave from the image receiving part 1 by activating the gas filled between the screen 6 and the screen 7 and thereby vibrating the screen to make the image receiving part 1 function as a speaker. An audio output system comprising the screens 6 and 7 and the shielding part 11 is referred to as a film speaker hereinafter. Since the screen 7 vibrates when an audio signal is applied to the film speaker, the positions in which light beams 2 and 3 emitted from the light source 4 are applied to the image receiving part 1 slightly vary due to refraction of the light beams. This is equivalent to that the positions of the light beams reflected at the screen keep to vary slightly, and therefore, the position of a point A at which the intensity of the reflected light appears large varies, as in the first embodiment. Accordingly, it is possible to prevent speckle noise without attenuating the projected laser beams. Further, when using the film speaker, the image receiving part 1 itself functions as a speaker. Therefore, there is no necessity of adding a special speaker system, whereby space-saving of the display system can be simultaneously achieved.

However, when displaying still-picture contents or voiceless moving picture contents, there occurs no screen vibration because there is no audio, resulting in speckle noise. So, it is necessary to apply a signal to the film speaker even when there is no audio signal from the contents. The human auditory system is hard to sense a sound higher than 20000 Hz. Accordingly, a random signal for outputting a sound higher than 20000 Hz (hereinafter referred to as a high-frequency generating signal) is applied to the film speaker to generate a high-frequency acoustic wave from the image receiving part 1. When a high-frequency generating signal was actually applied to the film speaker, the screen was vibrated randomly under the state where the signal was sensed as being silent by humans. Accordingly, prevention of speckle noise becomes more reliable by supplying a high-frequency generating signal to the screen even when there is an audio signal from the contents.

As described above, in the display device according to the second embodiment of the invention, the image receiving part comprising at least two screens and a shielding part for sealing the circumferences of the screens is made to function as a speaker, speckle noise can be reduced, and further, space-saving of the display system can be achieved.

While in this second embodiment a description has been given of a display device that emits laser beams to screens and monitors reflected light beams, it is obvious that the same effects as mentioned above can be obtained even when using a display device in which laser beams transmit screens.

Embodiment 3

Figure 3:
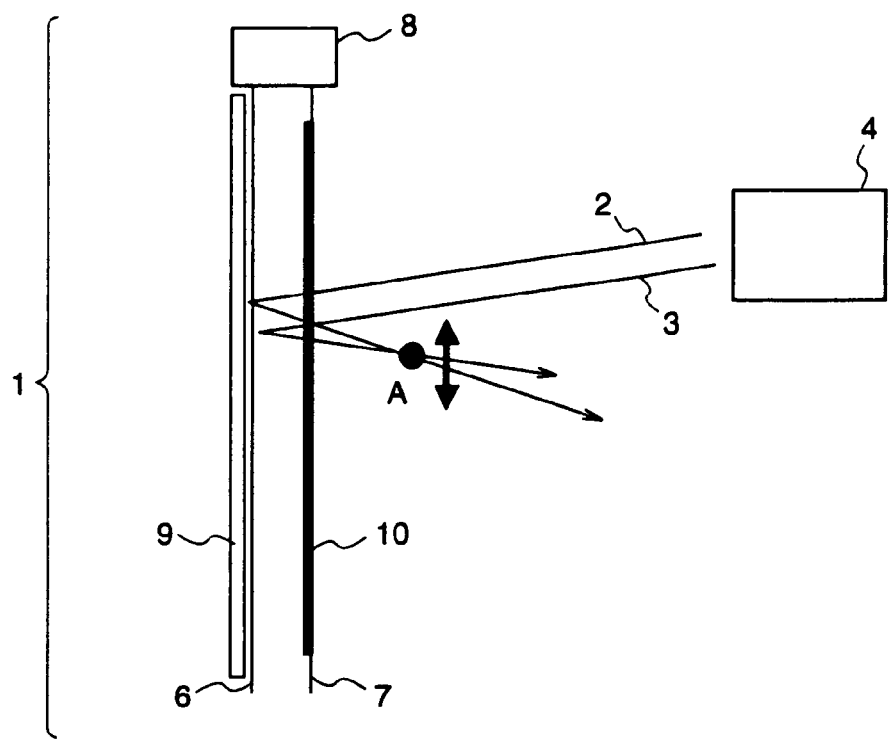
FIG. 3 is a schematic block diagram illustrating a display device according to a third embodiment of the present invention.
Figure 4:
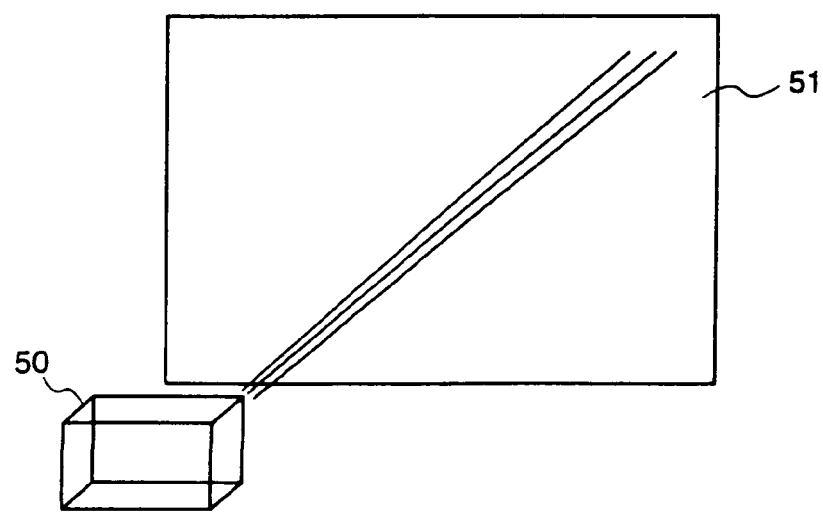
FIG. 4 is a schematic block diagram illustrating a conventional display device.
Figure 5:
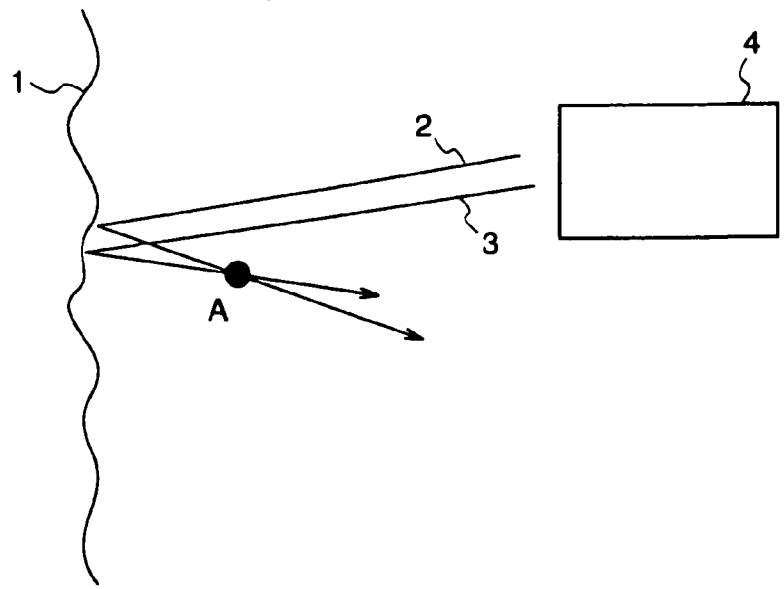
FIG. 5 is a diagram for explaining the speckle noise generation principle.
Figure 6:
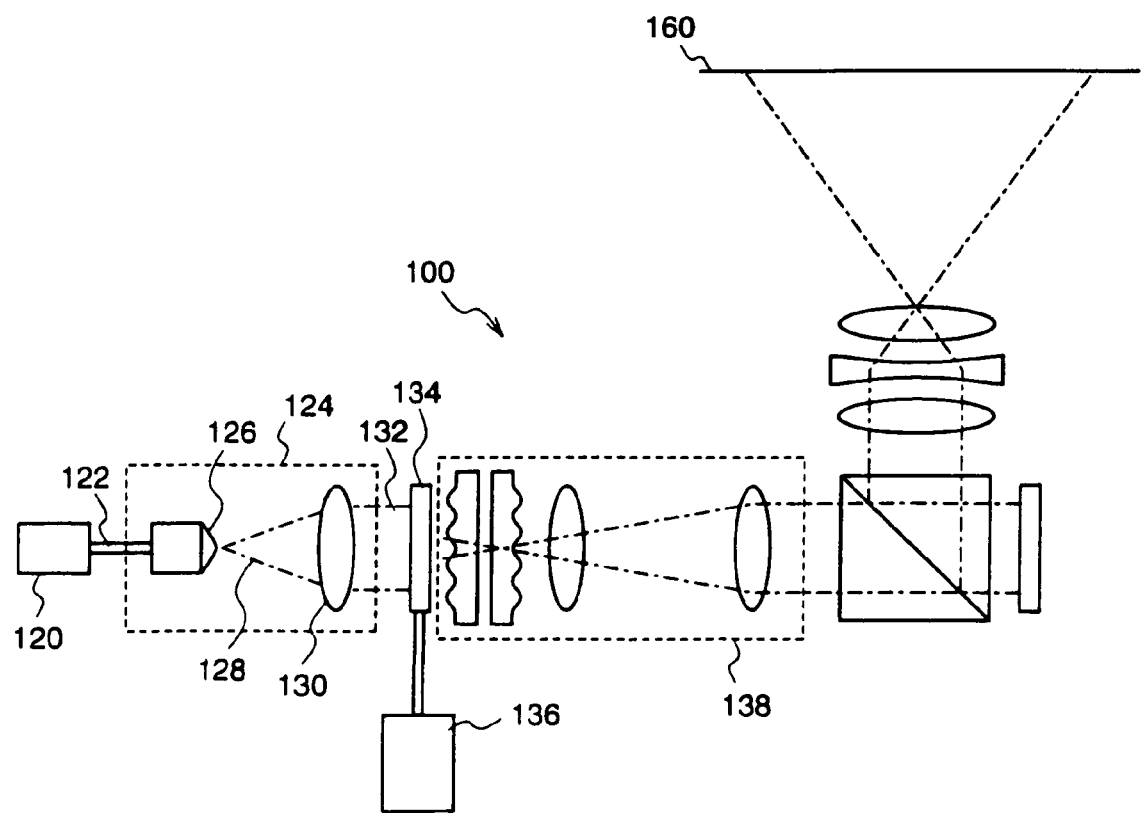
FIG. 6 is a schematic block diagram illustrating a conventional display device.

FIG. 3 is a lateral view of a display device according to a third embodiment of the present invention. The same constituents as those shown in FIG. 1 are given the same reference numerals. In the display device relating to the third embodiment of the invention, an image receiving part 1 is composed of two or more screens, and a coil is provided on at least one of the screens while a metal film as a magnetic body is provided on at least one of the remaining films.

Hereinafter, a description will be given of the case where the image receiving part 1 comprises two screens. With reference to FIG. 3, in the display device according to the third embodiment of the present invention, the image receiving part 1 is composed of screens 6 and 7, and a coil 9 is provided on the screen 6 while a metal film 10 is provided on the screen 7, as means for vibrating the screens. The metal film 10 comprises Fe as a magnetic material. When current is randomly supplied to the coil 9, an electric field occurs, whereby the metal film 10 vibrates. Since the screen 7 vibrates due to the vibration of the metal film 10, the position of a point A at which interference occurs varies randomly, whereby speckle noise is reduced. Further, the construction of the third embodiment improves steadiness when vibration occurs.

As described above, according to the display device relating to the third embodiment of the present invention, the image receiving part comprises two or more screens, and at least one of the screens is provided with a coil while at least one of the remaining screens is provided as a metal film as a magnetic material, whereby the metal film is vibrated. Therefore, it is possible to reduce speckle noise while improving steadiness when vibration occurs.

While in this third embodiment the metal film 10 comprises Fe, the metal film 10 may comprise a magnetic material other than Fe, such as Ni or Co, may be employed.

APPLICABILITY IN INDUSTRY

A display device according to the present invention is useful as a display device having a coherent light source.

The invention claimed is:

1. A display device comprising:
a unit for emitting coherent light and displaying an image; and
an image receiving part onto which coherent light can be projected, said image receiving part comprising at least two screens, at least one of the screens capable of being vibrated by an airflow supplied to at least one of a front surface or rear surface of said at least one screen.

2. A display device as defined in claim 1, additionally comprising a cooling fan for supplying said airflow.

3. The display device according to claim 2, wherein the cooling fan is capable of directing the airflow between the two screens.

4. A display device as defined in claim 1 wherein said image receiving part is capable of functioning as a speaker.

5. A display device as defined in claim 1 wherein said image receiving part is capable of generating an acoustic wave of a high frequency.

6. A display device as defined in claim 5 wherein the frequency of the acoustic wave is not less than 20000 Hz.

7. The display device according to claim 1, wherein one of the two screens is transparent.

8. A display device comprising:
a unit for emitting coherent light and displaying an image; and
an image receiving part onto which coherent light can be projected, said image receiving part capable of being vibrated by an electric effect,
wherein said image receiving part comprises at least two screens, at least one of the screens having a coil, at least another of the screens having a magnetic film thereon, such that supplying a current to said coil vibrates the screen having the magnetic film thereon.

9. A display device as defined in claim 8 wherein said magnetic film comprises Fe.

* * * * *